(12) United States Patent
Walls

(10) Patent No.: US 6,988,713 B2
(45) Date of Patent: Jan. 24, 2006

(54) ADJUSTABLE LATCH PLATE FOR OPEN-TOP VEHICLE

(76) Inventor: Eric L. Walls, 4665 Helmsbridge Ct., Grove City, OH (US) 43123

( * ) Notice: Subject to any disclaimer, the term of this patent is extended or adjusted under 35 U.S.C. 154(b) by 150 days.

(21) Appl. No.: 10/722,271

(22) Filed: Nov. 25, 2003

(65) Prior Publication Data

US 2005/0133769 A1 Jun. 23, 2005

(51) Int. Cl.
*B25B 25/00* (2006.01)
(52) U.S. Cl. ............ 254/218; 254/224; 24/69 ST; 24/71 ST; 296/100.04; 296/100.15; 296/100.16
(58) Field of Classification Search ........... 254/213, 254/217, 218, 222, 224, 225; 24/68 R, 69 ST, 24/69 CF, 71 ST, 68 CD; 296/98, 100.01, 296/100.04, 100.05, 100.15, 100.16
See application file for complete search history.

(56) References Cited

U.S. PATENT DOCUMENTS

| 563,409 | A | * | 7/1896 | Pickford | 254/231 |
|---|---|---|---|---|---|
| 1,481,424 | A | * | 1/1924 | King | 254/219 |
| 2,623,730 | A | * | 12/1952 | Wagnon | 254/225 |
| 4,225,175 | A | | 9/1980 | Fredin | |
| 4,484,777 | A | | 11/1984 | Michel | |
| 4,529,098 | A | | 7/1985 | Heider et al. | |
| 4,657,062 | A | * | 4/1987 | Tuerk | 160/243 |
| 4,659,134 | A | | 4/1987 | Johnson | |
| 4,691,957 | A | | 9/1987 | Ellingson | |
| 5,180,203 | A | | 1/1993 | Goudy | |
| 5,623,751 | A | * | 4/1997 | Knutson | 24/71.1 |
| 5,765,901 | A | | 6/1998 | Wilkens | |
| 5,924,758 | A | | 7/1999 | Dimmer et al. | |
| 5,984,379 | A | | 11/1999 | Michel et al. | |
| 6,193,299 | B1 | * | 2/2001 | Than | 296/100.15 |
| 6,435,599 | B2 | | 8/2002 | Than | |

* cited by examiner

*Primary Examiner*—Emmanuel Marcelo
(74) *Attorney, Agent, or Firm*—Jason H. Foster; Kremblas, Foster, Phillips & Pollick

(57) ABSTRACT

The invention is a device for receiving and drawing tight an edge of a tarp on a moveable vehicle. The tarp edge retainer has a latching member with a latch plate and an arm. The latch plate has an inverted channel and a lip, under which the edge of a tarp can extend in an operable orientation. The arm extends from the latch plate, through a guide and connects to a displacing means. The invention further includes a spring means mounted to the latching member for returning the latching member to a rest position.

24 Claims, 8 Drawing Sheets

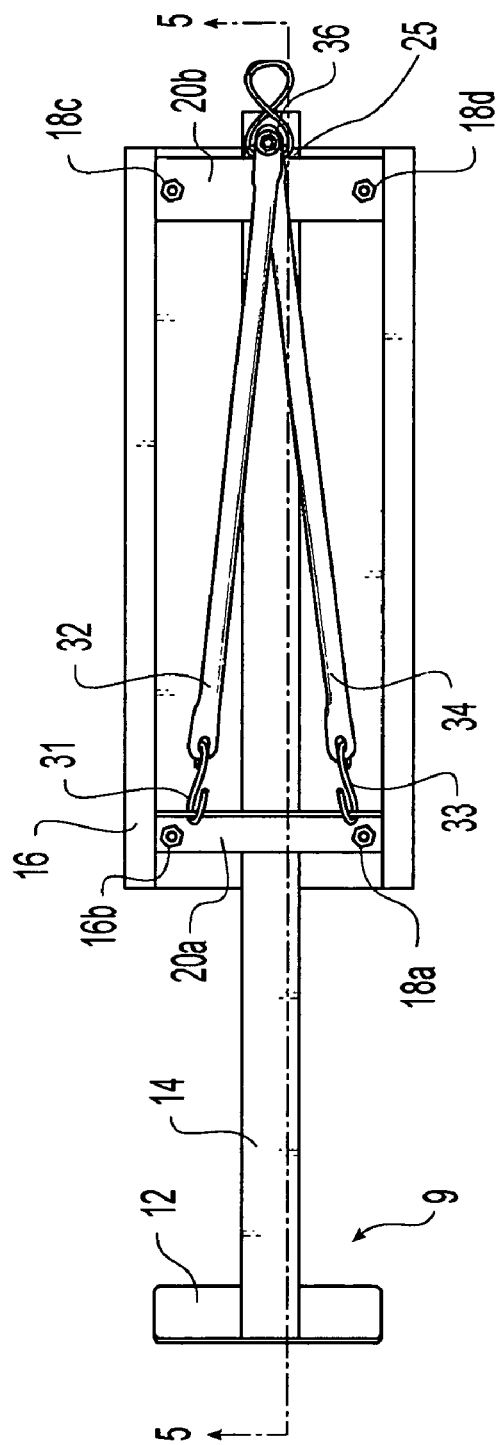
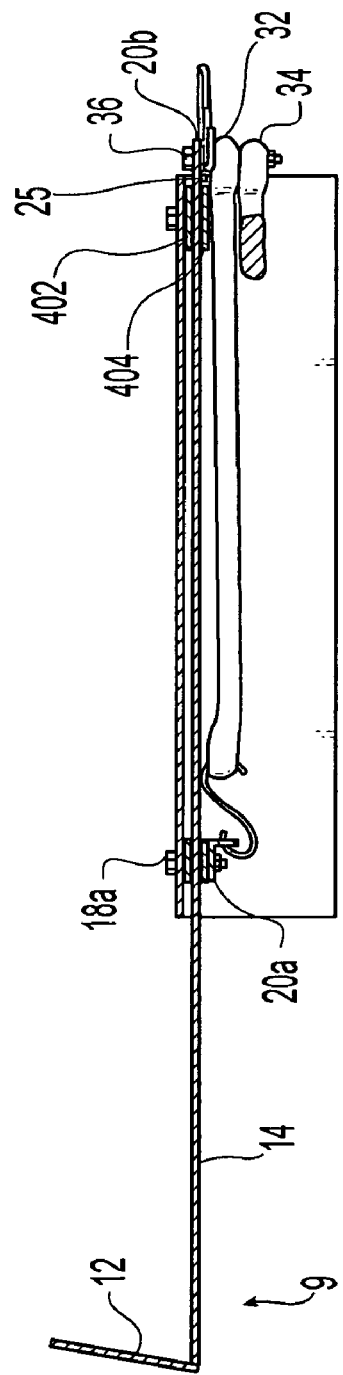
Fig. 4
Fig. 5

ADJUSTABLE LATCH PLATE FOR OPEN-TOP VEHICLE

BACKGROUND OF THE INVENTION

1. Field of the Invention

This invention relates generally to a device for retaining a tarp on a movable vehicle, and more specifically to a device for retaining the free edge of a tarp fastened at an opposite edge to a vehicle having an open top for hauling.

2. Description of the Related Art

The industries that use open top transfer trailers often haul loads that are bulky, such as trash, mulch, and sawdust and will try to place as much product in the trailer as possible. Often the load is unevenly distributed, causing some areas of the trailer to become heaped up over the top of the trailer's sidewalls. These loads can blow out while traveling down the road. Therefore, these open-top trailers must have a cover installed over the trailer or truck bed whenever traveling on public roadways.

There are many methods and apparatuses used in the industry for covering an open top transfer trailer or truck bed. Tarps are widely used, but are very time consuming to install if they are free or "hand" tarps. In most operations where hand tarps are used, there is a scaffold or tarp rack at the loading station where the driver can pull the trailer and spread the tarp out over the load. If there is no tarp rack, the driver has to climb on top of the load and spread out the tarp, which is potentially dangerous due to a risk of falling. The driver then has to walk around the side of the trailer, hook straps to the tarp and pull the straps tight while hooking the straps to the trailer. These tarps are the least expensive method, but are by far the most time-consuming to install and the most dangerous for the driver.

A ratchet strap side roll tarp system is a second type of tarp used in this industry. This tarp has straps that are permanently attached to one side of the tarp and has a pipe attached along the same side of the tarp. The driver inserts a crank handle in the end of the pipe and rolls the tarp open and closed across the top of the trailer by cranking the handle. The straps hopefully fall over the edge of the trailer. The driver then threads each of the straps that are attached to the tarp through ratchets attached to the bottom of the trailer and then tightens the tarp. This system allows the driver to open and close the tarp from the ground rather than up high at the top of the trailer. However, the straps may become trapped between the tarp and the load, forcing the driver to use a long pole to retrieve the straps or climb on top of the load and free the straps manually. Additionally, on a windy day a strap may flap about making it difficult for the driver to capture the strap for securing it to the truck. This system also consumes a lot of time in requiring the driver to thread each strap through each ratchet every time the trailer is filled and emptied.

The Shur-Co. (Yankton, S. Dak.) Shurlock Side Roll Tarp System has a tarp that is similar to the ratchet system described above, but there are no straps on the tarp. The Shurlock system has a single latch plate that is permanently attached to the topside rail of the trailer at one side edge and extends the entire length of the trailer. To operate this system, the driver cranks the crank handle to roll the tarp across the trailer, the tarp roll pipe is then tightened under the latch plate and the crank handle is locked to the side or back of the trailer.

One significant problem with this system is that it does not account for "heaping" of the load that is common. Because the entire length of the free tarp edge is tightened to the same extent, the tarp does not tighten properly when the load has heights that vary along the trailer length. Instead, the tarp is very tight around the heaped portion of the load, but loose in areas that are not piled as high in the trailer. This may cause the tarp to flap and tear in the wind.

The Donavan Enterprises, Inc. (Stuart, Fla.) SideWinder system is also made for the open top transfer trailer. The SideWinder has a steel frame that fits on top of the trailer and has a mesh tarp attached to the frame. The frame is hooked to a hydraulic ram and an electric pump that opens and closes the tarp. The frame and tarp are moved as a unit up and over the load and connected on the opposite side of the trailer to a cable. The problem with this system is that it is very expensive and may require very frequent maintenance.

Therefore, there is a need for a tarp system that overcomes the deficiencies of the prior art.

BRIEF SUMMARY OF THE INVENTION

The invention is a tarp edge retainer for receiving and drawing tight an edge of a tarp on a moveable vehicle. The tarp edge retainer has a latching member with a latch plate and an arm. The latch plate has an inverted channel and a lip, under which the edge of a tarp can extend in an operable orientation. The arm extends from the latch plate, through a guide and connects to a displacing means. The invention further includes a second means, mounted to the latching member for returning the latching member to a rest position.

BRIEF DESCRIPTION OF THE SEVERAL VIEWS OF THE DRAWINGS

FIG. 4 is a bottom view illustrating an embodiment of the present invention.

FIG. 5 is a side view in section illustrating an embodiment of the present invention.

Figure 1:
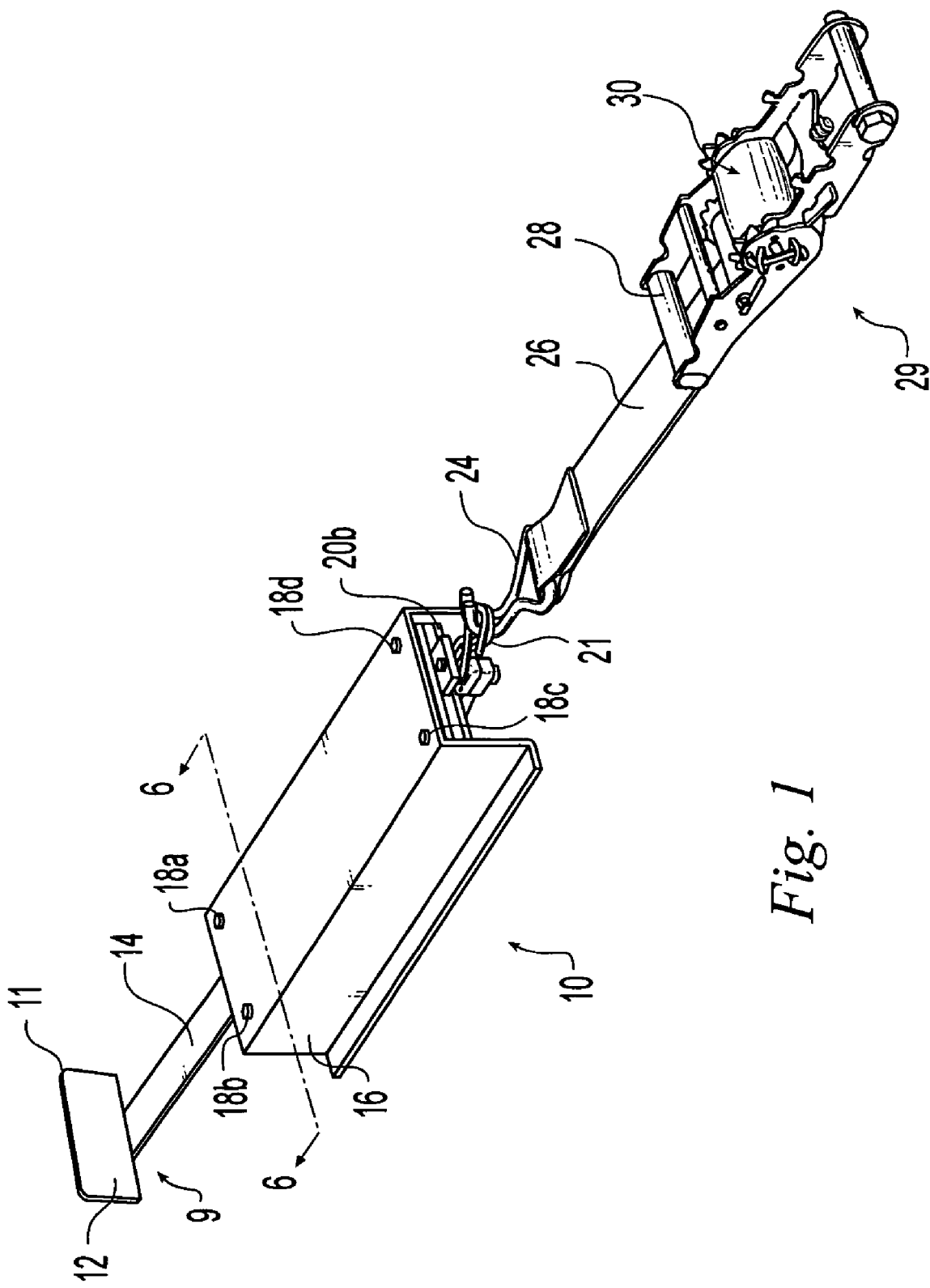
FIG. 1 is a view in perspective illustrating a preferred embodiment of the present invention.
Figure 2:
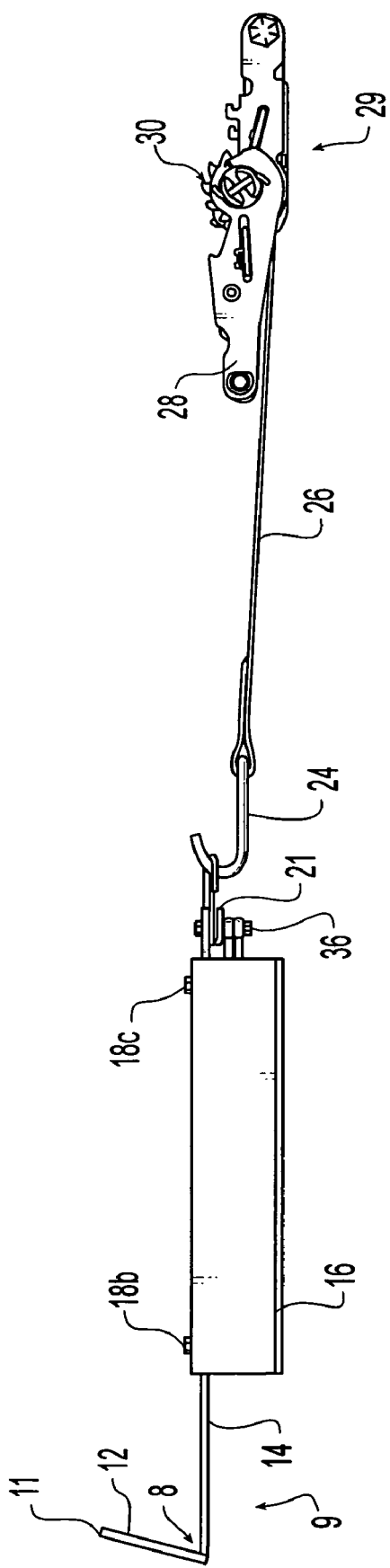
FIG. 2 is a side view illustrating an embodiment of the present invention.
Figure 3:
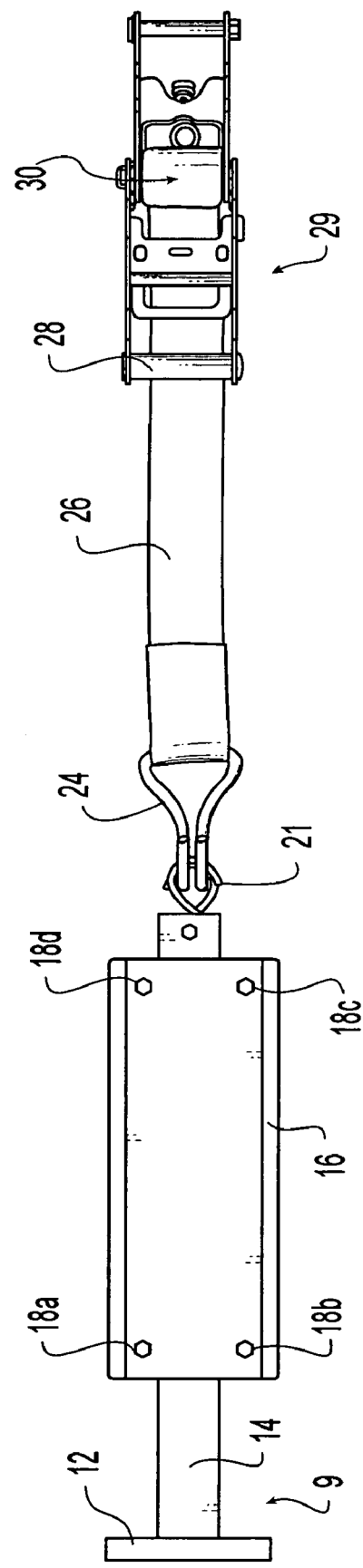
FIG. 3 is a top view illustrating an embodiment of the present invention.
Figure 6:
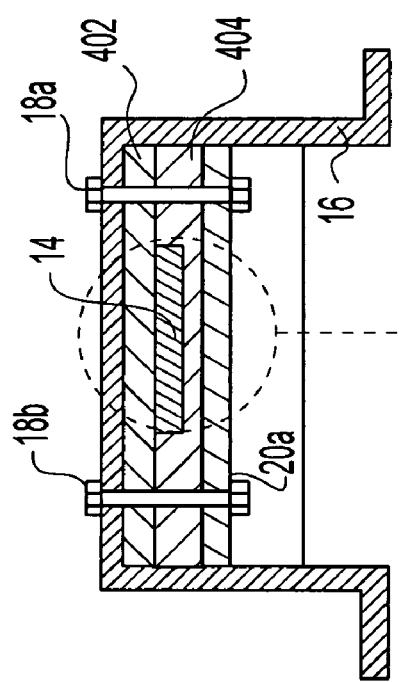
FIG. 6 is a view in section through the line 6—6 of FIG. 1, illustrating a guide on the present invention.
Figure 6:
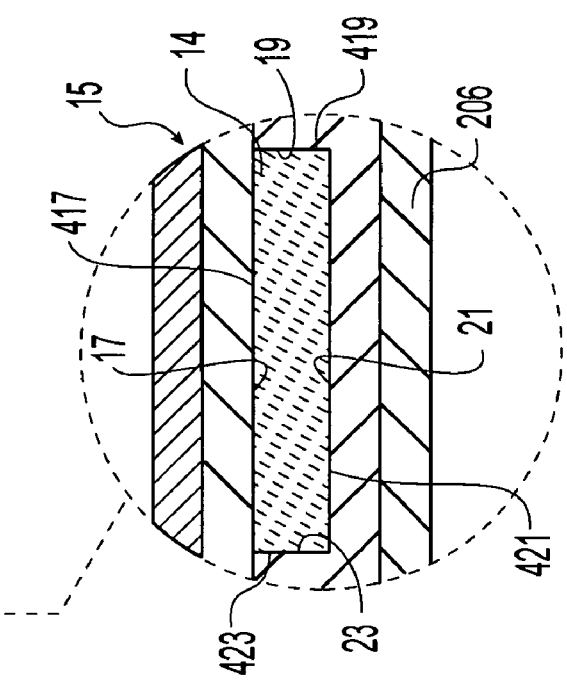

In describing the preferred embodiment of the invention, which is illustrated in the drawings, specific terminology will be resorted to for the sake of clarity. However, it is not intended that the invention be limited to the specific term so selected and it is to be understood that each specific term includes all technical equivalents, which operate in a similar manner to accomplish a similar purpose. For example, the word connected or term similar thereto is often used. They are not limited to direct connection, but include connection through other elements where such connection is recognized as being equivalent by those skilled in the art.

DETAILED DESCRIPTION OF THE INVENTION

The preferred embodiment of the present invention is shown in FIGS. 1 through 7. The tarp edge retainer 10 has a latching member 9 that is made up of a latch plate 12 and an arm 14 extending from the latch plate 12. The latch plate 12 has a lip 11 and forms an inverted channel 8 with the arm 14. The lip 11 is the terminal edge of the latch plate 12, under which the edge of a tarp extends when the latch plate is in an operable position on a vehicle, such as a trailer (see FIG. 7).

The arm 14 preferably extends through a guide, such as the track 15 (see FIG. 6), having four sidewalls 17, 19, 21 and 23 that seat against four sides of the rectangular cross-section arm 14 to form a bearing surface. As is described below in more detail, the arm 14 is displaced longitudinally during use. The first and second track sidewalls 17 and 19 restrict side-to-side movement of the arm 14, and the third and fourth track sidewalls 21 and 23 restrict front-to-back movement of the arm 14 within the track 15 when the tarp edge retainer 10 is in an operable position. Longitudinal movement of the arm 14 is permitted by the track 15.

The track 15 is preferably formed in a housing 16 that is attached to a moveable vehicle. A "moveable vehicle" is one that, in its normal operation, moves loads at speeds that could cause a tarp to flap in the wind. Examples include trailers and trucks. The sidewalls 17, 19, 21 and 23 of the track 15 preferably are formed in the plates 402 and 404 mounted in the housing 16. The plates 402 and 404 are held in the housing 16 by threading the carriage bolts 18a–18d through apertures in the top side of the housing 16, through aligned apertures in the plates 402 and 404 and aligned apertures in the braces 20a and 20b. The arm 14 can extend through a more basic track having fewer or smaller sidewalls, such as a U-hook. The bolts 18a, 18b, 18c and 18d, shown in FIG. 1 can also serve as sidewalls due to the fact that they restrict lateral movement of the arm 14.

In the preferred embodiment, the carriage bolts 18a–18d connect the housing 16 and the plates 402 and 404 together. Other connecting means can be used as an alternative to secure the plates and braces to the housing 16, and a variety of alternative guide and track structures can be constructed that function in the same manner as the track 15. It is preferred that the housing 16 is made of aluminum and the plates 402 and 404 are made of a low friction polymer, such as those sold under trademarks TEFLON or DELRIN. However, a variety of other suitable materials can be used including, steel, wood, composite, etc., as will become apparent from the description of the invention.

A spring is connected to the arm 14 at one end and to the housing 16 at a second, opposite spring end. In the preferred embodiment there are two conventional rubber tie down straps 32 and 34 that serve as the spring and are best viewed in FIG. 4. However, the springs can be any type of spring including coil, elastomeric, hydraulic, pneumatic, electromagnetic, or any conventional spring. The straps 32 and 34 have hooks 31 and 33 on one end that extend through openings in the L-brace 20a that is part of the housing 16 due to its rigid mounting thereto. The hooks 31 and 33 connect the straps 32 and 34 to the housing 16. On the opposite strap ends, the traditional tie down hooks are removed and a carriage bolt 36 extends through a bore in the arm 14 at the end of the arm 14 opposite the latch plate 12, and through the openings in the straps 32 and 34. In the preferred embodiment, the straps 32 and 34 return the latching member 9 to a rest position shown in FIG. 4, and serve as a bias to bias the latching member 9 to this rest position. Of course, the straps 32 and 34 could attach to the housing 16 and the latching member 9 in any other suitable manner, and the number and type of springs used is not critical.

A stop 25 is mounted to one side of the arm 14 and is positioned near the bolt 36 as best seen in FIG. 5. The stop 25 creates a locally thicker region on the arm 14 that prevents the stop 25 from extending through the track 15. The stop 25 thus keeps the latching member 9 from being forced by the springs past the rest position and from coming out of the track 15 completely. The stop 25, in the preferred embodiment, is made of steel but can be made of a variety of suitable materials. In the preferred embodiment, the arm 14 and the latch plate are made of steel, but any suitable material can be used, including composite, wood, aluminum, etc.

A reel 29 is connected to the arm 14 at the end where the bolt 36 attaches. The reel 29 is for applying a force to the latching member 9. The belt 26 extends from the spool 30 to the arm 14. The hook 24 preferably extends from the belt 26 into a loop 21 in the bolt 36 of the arm 14. The second, opposite belt end wraps around the spool 30. The reel 29 includes a ratchet mechanism for preventing rotation of the spool 30 in one direction, but permitting rotation in the opposite direction.

The reel 29, or any other means for applying a longitudinal force to the latching member 9, can connect to the latching member 9 in a variety of alternative ways. For example, a cable can extend from the arm and attach to a reel, the hook on the belt can be riveted or welded directly to the bolt on the arm, or an electric motor can be attached directly to the arm. These are just a few examples, others of which will become apparent from the disclosure herein.

Figure 7:
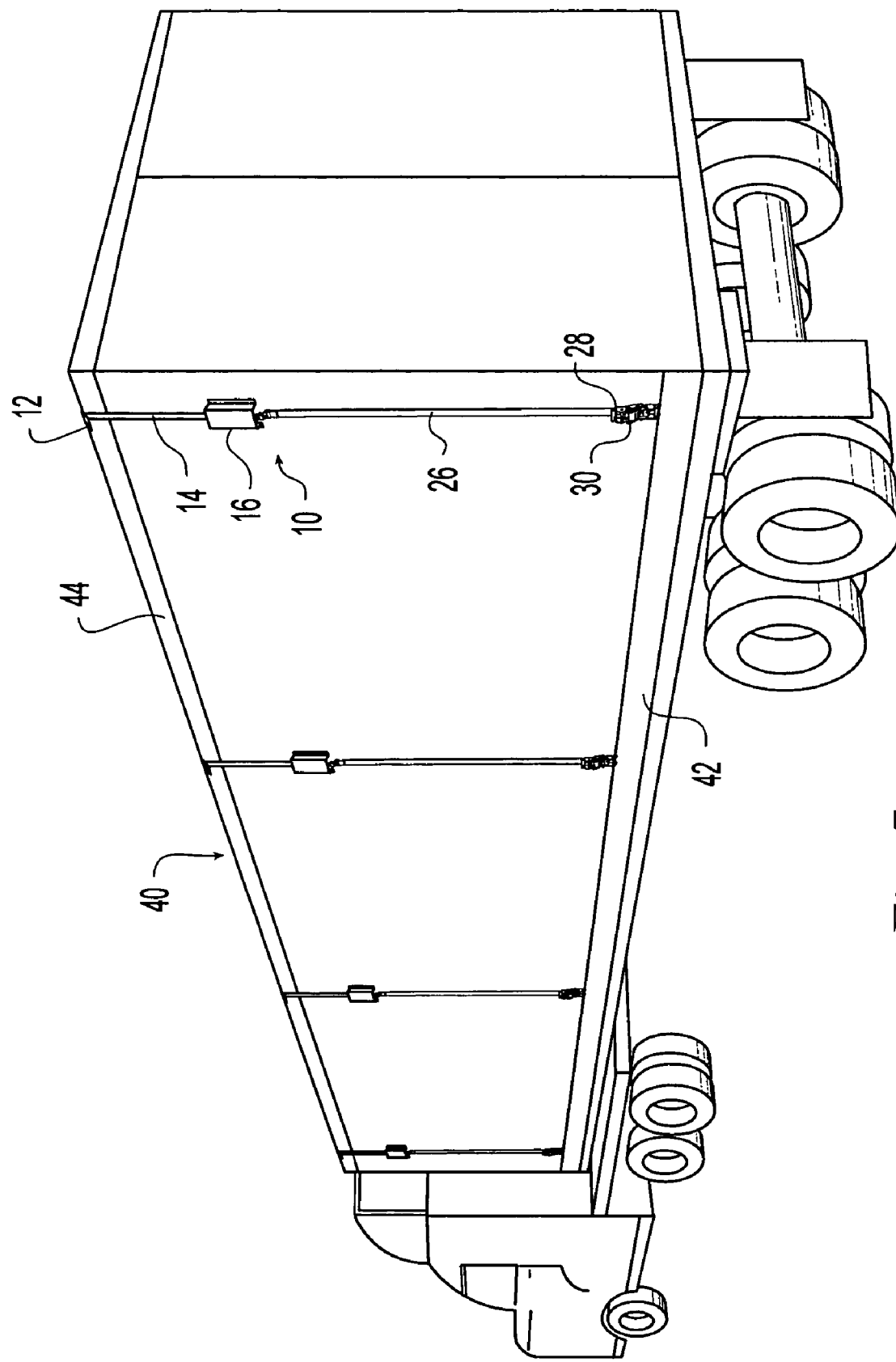
FIG. 7 is a view in perspective illustrating several embodiments of the present invention on a truck.

The reel 29 works like a conventional ratchet tie down system. The handle 28 is moved up and down repeatedly by a user, and this action winds the belt 26 around the spool 30 by rotating the spool 30 in one direction with every cycle of the handle, thereby tightening the belt 26. In the preferred embodiment, a plurality of tarp edge retainers 10 are attached to the side of a vehicle to retain a tarp's edge upon such tightening. Thus, the reel 29 is mounted on the side of a trailer 42, near the bottom as shown in FIG. 7, and the housing 16 is mounted on the side near the top of the trailer 44. Preferably, the housing 16 is bolted to the side of the trailer 42, and the reel 29 is likewise bolted to the trailer. The tarp edge retainer 10 can be used on any moveable vehicle on which a tarp or other flexible cover is used to close its open top.

Figure 8:
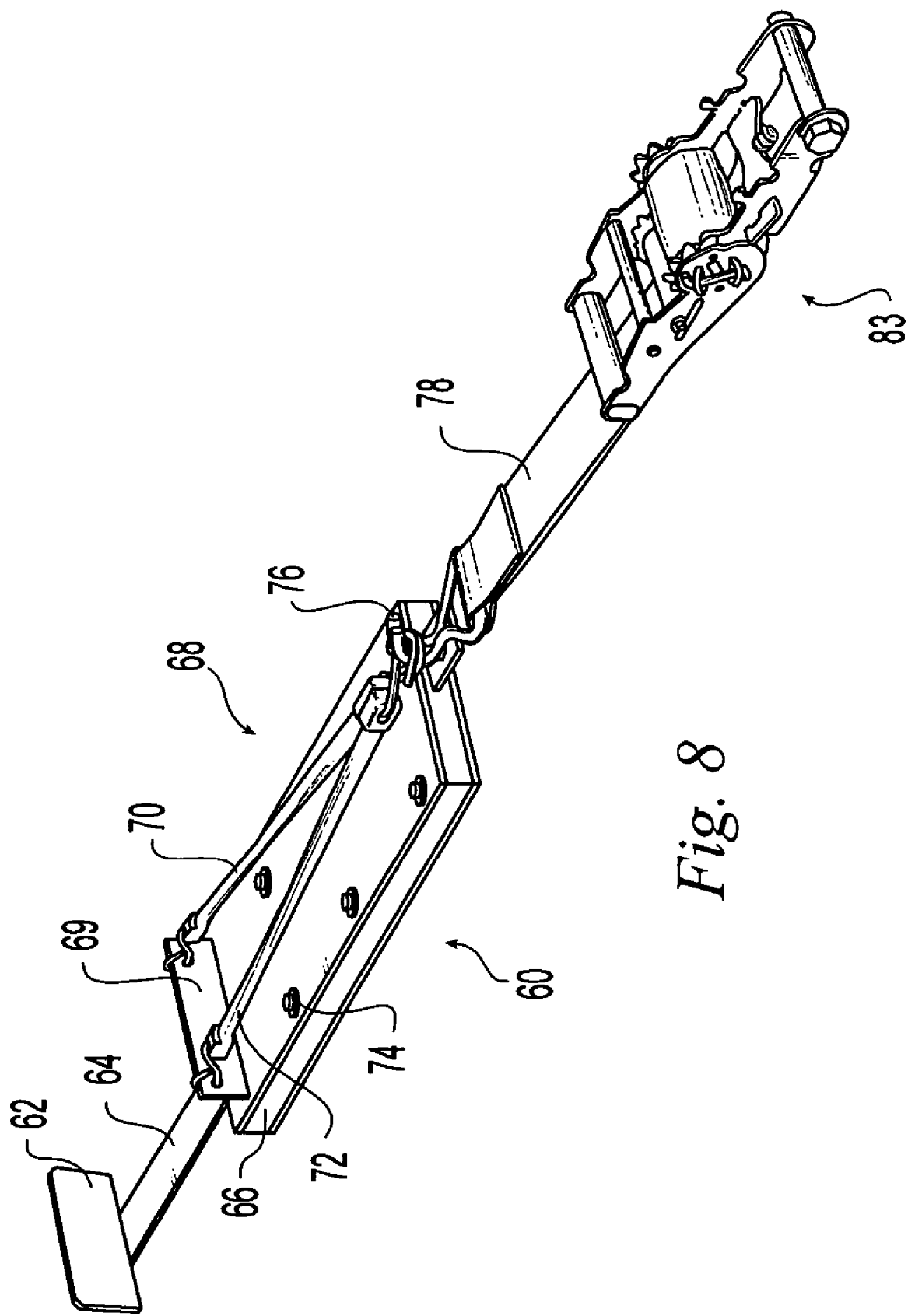
FIG. 8 is a view in perspective illustrating an alternative embodiment of the present invention.

A plurality of tarp edge retainers 10 is attached to the trailer, in the manner described above, for optimal use. Three, four or more tarp edge retainers 10 can be attached to the trailer, as shown in FIG. 8, to enable the operator to secure the tarp properly. For example, retainers can be attached near each end of the trailer, and one retainer can be positioned every four, eight or ten feet or at any suitable increment along the trailer's length. Additionally, the retainers can be attached to the front or back of the trailer for securing the front and back ends of the tarp, and any other modifications to the tarp or trailer will become apparent.

Once the tarp edge retainers 10 are in place, they are operated in the following manner. The user cranks the tarp (not shown), which would normally be rolled up and stored on a side opposite the tarp edge retainer 10, across the open top of the trailer 40 to cover the open top and the load. The tarp has a metal bar that extends the length of the tarp and is sewn into the tarp's free edge, which, when the tarp is completely open, hangs over the side of the trailer 40 in a conventional manner. The latching members, which begin in the rest position (as high as possible), have latch plates positioned slightly above and behind the free edge of the tarp. The user rolls the bar and tarp edge under all of the latch plates of the tarp edge retainers and then locks the crank handle in place in a conventional manner to prevent further rolling of the tarp edge. Next, the user displaces downwardly the latching member 9 of one of the retainers by pulling the handle 28 up and down multiple times. The belt 26 that is attached to the arm 14 is further wound around the spool 30, thereby removing any slack, and then the belt 26 begins to pull the arm 14 downwardly toward the reel 29 as the belt is wound around the spool 30 even further.

The downward displacement of the arm 14 displaces the attached latch plate 12 downwardly. This simultaneously pulls the metal bar in the tarp and the tarp, which are held in the channel 8 of the latch plate 12, downwardly. When the user pulls down the latching member 9, the angled lip 11 of the latch plate 12 keeps the tarp and bar from coming out of the channel 8. Thus, as the latching member 9 is moved downwardly, the tarp is tightened across the trailer to the degree desired for the height of the load at that position along the trailer's length, and the straps 32 and 34 are elongated. Each tarp edge retainer 10 is tightened in turn to the degree desired to secure the load in the trailer and decrease flapping due to areas in which the tarp is too loose.

To unload the trailer 40, the user must remove the tarp. This is accomplished at each tarp edge retainer by releasing the tension in the belt 26. To release the tension, the user releases the ratchet mechanism on the spool 30, which in turn releases the belt 26 tension in a conventional manner. The springs 32 and 34, which were elongated, and therefore applied a force to the arm 14 when the latching member 9 was at its lower position, return the latching member 9 to its upper rest position with the latch plate 12 at its highest point when the spool 30 is released to rotate freely. After each tarp edge retainer 10 is released, the tarp is unrolled from under the latch plates, the user then cranks the tarp back to the opposite side of the trailer and the load can be dumped.

A significant advantage to the tarp edge retainer 10 is that each latching member of each tarp edge retainer moves independently of the other latching members of the other retainers. Each latching member 9 can thus be tightened to a different degree to accommodate a heaping load and its needs for varying amounts of tightening along the trailer's length. The tarp covering the heaping area of the trailer 40 can be tightened an amount less than that of the non-heaping areas in the trailer 40, and flapping of the tarp is thereby eliminated or reduced.

An alternative to the preferred embodiment is shown in FIG. 8. In this embodiment, the housing 68 does not cover the elastic straps 70 and 72. The straps 70 and 72 face the user when in its operable orientation on a vehicle. The belt hook 76 is connected directly to the arm 64 by, for example, welding at an end opposite the latch plate 62. Further, the elastic straps 70 and 72 have hooks in both strap ends for connecting the straps 70 and 72 to the housing member 69 at one end and to the hook 76. The reel 83 operates substantially similar to the reel 29 of the preferred embodiment.

Figure 9:
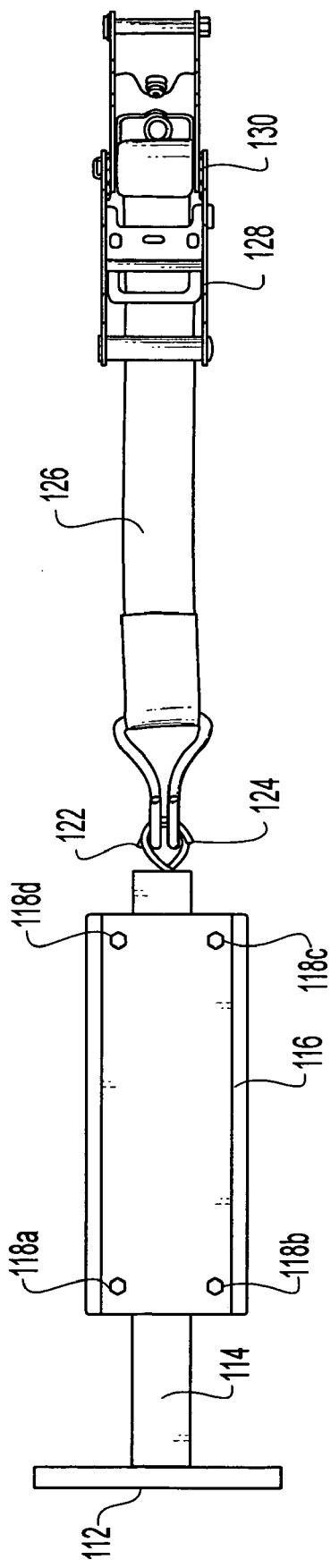
FIG. 9 is a top view illustrating an alternative embodiment of the present invention.
Figure 10:
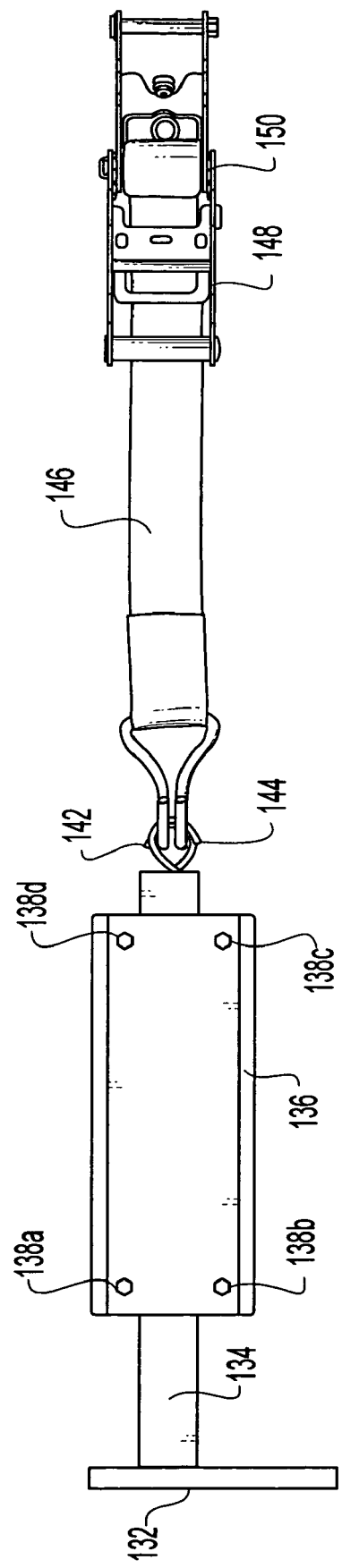
FIG. 10 is a top view illustrating an alternative embodiment of the present invention.

FIGS. 9 and 10 show various positions and lengths of the latch plate. The latch plate 112, shown in FIG. 9, is longer than the preferred latch plate 12, but the latch plate 112 covers more length of the tarp edge when in operation. The latch plate 132, shown in FIG. 10, is longer and offset to be positioned near an end of the truck or trailer so that the longer end of the latch plate 132 can extend as close to the truck's or trailer's end and keep the bar in the tarp's free edge as tight as possible along the bar's entire length. Of course, the offset of the latch plate 132 can be in the direction opposite that shown in FIG. 10. These offset latch plates are used in conjunction with the preferred embodiment to maintain the tension on the front and rear edges of the tarp.

Figure 11:
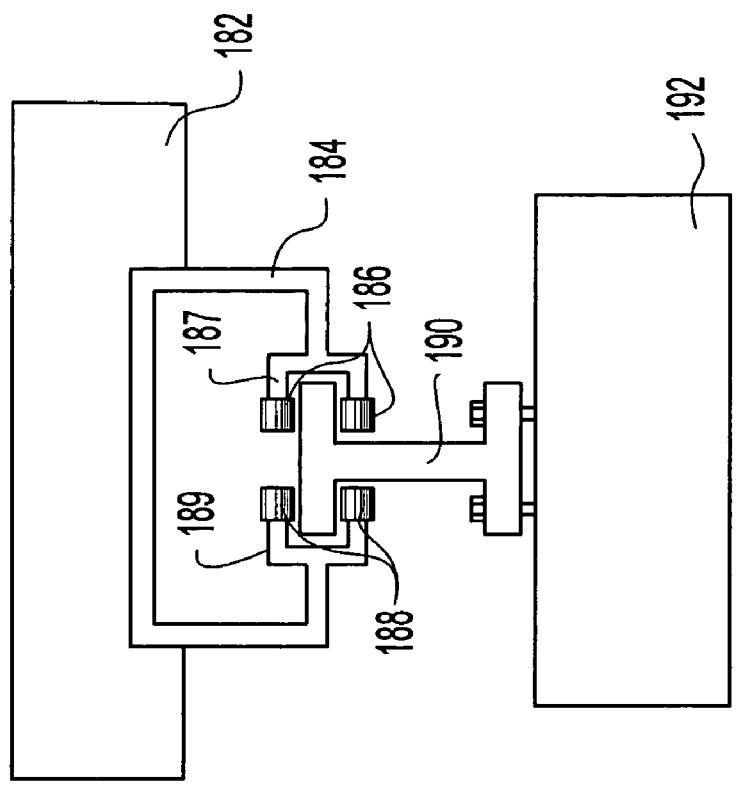
FIG. 11 is a schematic view illustrating an alternative embodiment of the track.

FIG. 11 illustrates an alternative to the latching member and track shown in FIGS. 1–8. The arm 184 has at least two wheel pairs 186 and 188 rotatably mounted on the axles 187 and 189. The wheels seat against the track 190 in the manner of a conventional roller coaster on its tracks. The wheel pairs 186 and 188 seat against and can roll along the upper and lower sides of the track 190, which is mounted to the trailer, and thereby serve as bearings. The arm 184 has a latch plate 182 near its top and can be displaced up and down to displace the latch plate 182 and tighten a tarp (not shown) under the channel of the latch plate 182. Alternatively, the configuration can be reversed so the track 190 is mounted to the latch plate while the arm 184 is mounted to a truck or trailer. This alternative shows that there are many substitutes for the track of the preferred embodiment, all of which will become apparent to the person of ordinary skill from the description herein.

Figure 12:
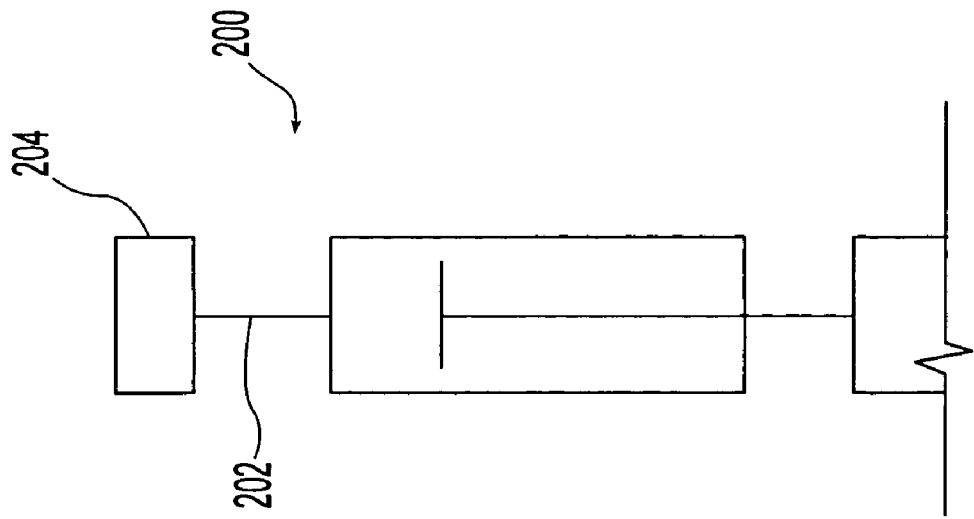
FIG. 12 is a schematic view illustrating a pneumatic ram.

FIG. 12 shows an alternative to the spring and reel of the FIG. 1 embodiment. A pneumatic ram 200 can be used in place of both the spring (which is a returning means) and reel (which is a displacement means) to both displace the latching member and return the latching member to a rest position. The pneumatic ram 200 is mounted to the vehicle wall and its displaceable arm 202 is mounted to a latch plate 204, and it operates to tighten and release the latch plate 204. Alternatively, the pneumatic ram 200 could replace the spring only. Further, the pneumatic ram 200 could replace the reel only.

While certain preferred embodiments of the present invention have been disclosed in detail, it is to be understood that various modifications may be adopted without departing from the spirit of the invention or scope of the following claims.

What is claimed is:

1. A device for receiving and drawing tight an edge of a tarp on a moveable vehicle, the device comprising:
   a) a latching member having a latch plate with an inverted channel and a lip, under which the edge of a tarp can extend in an operable orientation and an arm extending from the latch plate;
   b) at least one guide through which the arm extends;
   c) means mounted to the latching member for displacing the latching member and tightening the tarp; and
   d) means mounted to the latching member for returning the latching member to a rest position.

2. A device according to claim 1, wherein the at least one guide is a track.

3. A device according to claim 2, wherein the track at least partially surrounds the arm.

4. A device according to claim 2, wherein the track has at least two sidewalls seating against the arm for forming a bearing surface.

5. A device according to claim 4, wherein the arm has four sides and said at least two track sidewalls comprise four sidewalls seating against the four sides of the arms.

6. A device according to claim 2, further comprising a housing in which the track is formed, said housing being attachable to the vehicle.

7. A device according to claim 6, wherein said returning means is mounted to the latching member and the housing.

8. A device for receiving and drawing tight an edge of a tarp on a moveable vehicle, the device comprising:
  a) a latching member having a latch plate with an inverted channel and a lip, under which the edge of a tarp can extend in an operable orientation and an arm extending from the latch plate;
  b) at least one track through which the arm extends, said track having four sidewalls seating against the arm for forming a bearing surface;
  c) means mounted to the latching member for displacing the latching member and tightening the tarp; and
  d) means mounted to the latching member for returning the latching member to a rest position.

9. A device according to claim 8, further comprising a housing in which the track is formed, said housing being attachable to the vehicle.

10. A device according to claim 8, wherein said returning means is mounted to the latching member and the housing.

11. A device for receiving and drawing tight an edge of a tarp on a moveable vehicle, the device, comprising:
  a) a latching member having a latch plate with an inverted channel and a lip, under which the edge of a tarp can extend in an operable orientation and an arm extending from the latch plate;
  b) at least one guide through which the arm extends;
  c) a prime mover mounted to the latching member for displacing the latching member and tightening the tarp; and
  d) a spring mounted to the latching member for returning the latching member to a rest position.

12. A device according to claim 11, wherein the prime mover is a reel.

13. A device according to claim 12, wherein the at least one guide is a track.

14. A device according to claim 13, wherein the track at least partially surrounds the arm.

15. A device according to claim 13, wherein the track has at least two sidewalls seating against the arm for forming a bearing surface.

16. A device according to claim 15, wherein the arm has four sides and said at least two track sidewalls comprise four sidewalls seating against the four sides of the arms.

17. A device according to claim 13, further comprising a housing in which the track is formed, said housing being attachable to the vehicle.

18. A device according to claim 17, wherein the arm has a stop near one end of the track to abut the track and prevent the arm from sliding out of the track when returning to a rest position.

19. A device according to claim 18, wherein the reel includes a ratchet for resisting rotation in a direction.

20. A device according to claim 19, wherein the reel includes a belt that is connected to the arm at one belt end and at a second, opposite belt end said belt is connected to a spool around which the belt is wound to tighten the belt.

21. A device according to claim 20, wherein the spring connects to the latching member at one spring end and to the housing at a second, opposite spring end.

22. A device according to claim 21, wherein the spring is an elastomeric member.

23. A device according to claim 21, wherein the spring is a coil spring.

24. A device according to claim 21, wherein the spring is a pneumatic spring.

* * * * *